Patented May 17, 1938

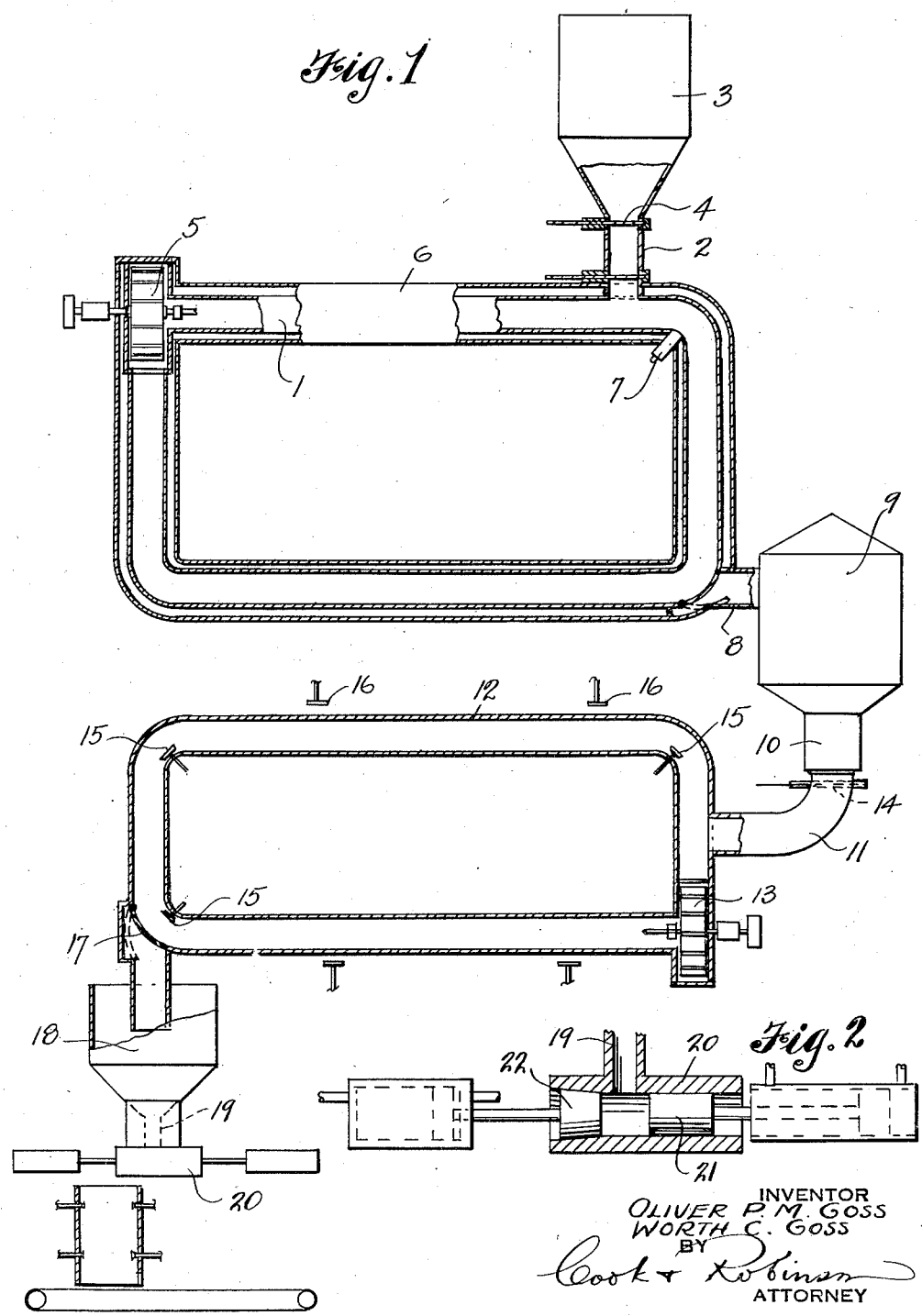

2,117,415

UNITED STATES PATENT OFFICE 2,117,415

METHOD OF MAKING FUEL BRIQUETTES

Oliver P. M. Goss and Worth C. Goss, Seattle, Wash., assignors to Carlisle Lumber Company, Onalaska, Wash., a corporation of Washington Application January 9, 1935, Serial No. 998

4 Claims. (Cl. 44—10)

This invention relates to improvements in fuel briquettes, and it has for its principal object to provide an improved method of manufacturing fuel briquettes from comminuted wood material derived from sawdust, chips, or other wood waste material, whereby the briquette is insured, while in storage, against deterioration due to the possible absorption of atmospheric moisture, and its burning condition is greatly improved by reason of a limitation in its contained moisture.

Heretofore it has been customary, and has been thought to be most desirable in the manufacture of briquettes from sawdust and similar material, to heat the comminuted material to a high temperature as a means of insuring the uniting of the particles in a solid, homogeneous mass when placed under the forming compression. Also, it was considered necessary, or at least, advisable to dry the briquette material to a moisture free condition prior to its being compressed in order that there would be no contained moisture that might produce steam and cause the briquette, while in the mold or afterward, to expand and thereby destroy its solidity. While the heating of the material for delivery to the mold does, to a certain extent, aid in the formation of an extremely solid briquette that will burn as a charcoal ember without flaking off or breaking apart, the added cost is not thought to be offset by the results obtained when it is taken into consideration that such a briquette must thereafter be protected against any possible reabsorption of atmospheric moisture.

It will be stated here that ordinarily there is such an amount of moisture contained in the atmosphere that a briquette, made from an absolutely moisture free material, will in due time reabsorb moisture, the amount of which depends upon the atmospheric condition in which the briquette is stored. Therefore, it will be understood that if a briquette, after being made from moisture free material is not coated with a moisture resisting agent, its solidity will, in due time, be destroyed due to the fact that the particles thereof in absorbing moisture, will expand and ultimately result in the briquette breaking apart, or flaking off; this result being very undesirable as it causes waste and litter and destroys the long burning quality of the briquette.

In a previous application made on a fuel briquette and method of making it, filed on July 12, 1933 under Serial No. 680,096, we stated that the material from which the briquette was formed was dried to a moisture free condition in an atmosphere of approximately 350 degrees Fahrenheit, and that this material while still hot from the drying process was compressed in a mold under a pressure of approximately fifteen tons to the square inch. This application of pressure incidentally increased the temperature of the briquette to an extent that it was smoking hot when removed from the mold. Then the briquette, while still hot, was dipped in a paraffin bath, thus to coat and prevent any possible re-absorption of moisture.

Manifestly, the coating of a briquette with paraffin to the thickness required to insure a protective coat of any particular value is costly. Therefore, extensive experimentation has been carried on for the purpose of devising means of eliminating this item of expense in briquette production, and still maintain adequate protective features for this type of fuel to insure against deterioration in storage and without destroying its long burning qualities.

As a result of these experiments, it has been found possible to make an excellent briquette from material containing some moisture and formed into a briquette while cold; that is, without the usual preheating. However, the percentage of moisture of the manufactured briquette must correspond substantially to that of the average atmosphere in which the briquettes are to be stored so that there will be no appreciable tendency of the briquette, when stored, either to absorb additional moisture, or to give it off.

In practising the present method, the material from which the briquettes are to be formed is comminuted from saw mill waste, such as sawdust, chips, splinters and ground up bark and other wood waste, and in view of the fact that it is a difficult matter to evenly dry a mixture of different material to a definite moisture content, especially when the materials are received all the way from soggy, wet condition to approximately dry, the comminuted material, prior to its being compressed into briquettes, is passed through a dryer and reduced to a moisture free condition. Definite charges of dry material are then circulated within a special system of pipes into which, by use of sprays, or the like, that definite quantity of moisture desired, in the form of steam or atomized water, is injected while the material is being circulated, thus to cause the dry material to re-absorb a certain definite percentage of moisture. The hydrated material is then compressed, without heat being applied, into briquettes.

The reason for this drying out of the material and then the hydrating of it to a definite moisture content, will be understood, when it is considered that the comminuted material ordinarily provided for briquettes, prior to being dried, is not of uniform moisture content, and cannot economically be dried to reduce a mixed batch of different materials to a uniform moisture content. For example, one amount of sawdust might contain forty per cent moisture, another amount to be mixed therewith might contain only twenty per cent. If it were attempted in the ordinary drying out operation to reduce these materials to a ten per cent moisture content, part of the material might be reduced, for example, to five per cent while the other would still retain twenty-five per cent moisture. Manifestly, it is practically impossible to quickly reduce mixed materials of unlike moisture content to an even moisture content throughout. However, by first reducing all material to an absolutely moisture free condition, it is then easily possible to apply moisture in any desired amount to insure a uniform product of a predetermined percentage of moisture.

For the purpose of initially drying the comminuted material to a moisture free condition, preferably we would employ the machine of our co-pending application, filed on December 20, 1933 under Serial No. 703,224, Patent No. 1,985,250 entitled "Machine for drying and powdering wood waste." In this particular machine there is an elongated, continuous, tubular passage in which a high velocity circulating fan is interposed. Also, means is provided for injecting into the system batches of definite weight. The fan, in operation, causes the injected material to be blown violently about the passage and this passage is jacketed to enclose a heating medium whereby the material is heated to such extent that its contained moisture is driven off in the form of steam. Furthermore, this material, incident to its violent circulation, is partially rendered to powdery form, and the percentage that is reduced to powder may be controlled within certain limits by the extent of the drying period. The formation of the powder, as set forth in the specification of the above mentioned patent, is very desirable by reason of its beneficial effect in the formation and permanency of the briquette.

For hydrating this dry, moisture free material to a definite and predetermined moisture content, a pipe system similar to the dryer is provided. This hydrator comprises a continuous, tubular passage with a fan for forcing a violent circulation of air about the system and provided with spray devices whereby moisture in the form of steam or finely atomized water may be injected into the circulating air stream. Batches of the dried material of definite weight are delivered into the hydrating system from storage or preferably directly from the dryer through a suitable weighing device, and as the material is circulated it quickly absorbs the injected moisture.

Assuming that a batch of comminuted material has been dried to a moisture free condition and that by injection of moisture has been hydrated, for example, to a specified moisture content, and that this material is compressed into briquettes, it is quite apparent that they may then be stored under ordinary atmospheric conditions without danger of re-absorbing any additional amount of moisture from the air that would cause destruction or deterioration thereof by reason of expansion. This will be understood when it is considered that the briquette already contains that per cent of moisture which, under ordinary conditions, it would have absorbed from the atmosphere if placed there in bone dry condition and it does not have the property of further absorption.

As an illustration of a means for practising the present invention, we have provided the accompanying drawing, wherein—

Fig. 1 diagrammatically illustrates a means for carrying out the present method.

Fig. 2 is a detail of the briquette press cylinder.

Referring more in detail to the drawing—

1 designates a continuous, tubular duct, provided at one point with a connection 2 from a supply hopper 3; the connection having a normally closed slide valve 4 which may be opened for the charging of the system from hopper 3 with a batch of material to be dried. A blower fan 5 is interposed in the duct to create a violent circulation of air in the system, thereby to carry the injected material in suspension for drying. The pipe 1 has an encasing jacket 6 throughout its length to provide for enclosing it in a heating medium such as super-heated steam, with which the jacket may be charged, as an aid to drying and whereby the moisture in the material to be dried by reason of heat, is expelled in the form of steam and this is allowed to escape from the pipe system through a relief valve 7.

A pipe 8 connects the pipe 1 with a separator 9 that discharges into a weighing machine 10 and this in turn is connected by a pipe 11 with a continuous pipe 12. This latter pipe has a circulating fan 13 like that used in the drying system embodied therewith whereby material received into the pipe system 12 is violently circulated. A valve 14 in the pipe 11 may be opened for delivery of material from the weigher directly into pipe 12. Located in the pipe system 12 at suitable points are sprays 15 whereby water in finely atomized form, or as steam, is injected, to be absorbed by the dried material. A system of sprays 16 discharge a cooling medium over pipe 12 to cool the dried material. A gate 17 controls discharge of material from pipe 12 to a storage hopper 18.

From the hopper 18, the material may pass through a feed tube 19 to a press cylinder 20 and there compressed into briquettes by the coaction of pistons 21 and 22 operated in timing by any suitable means. As here shown, the piston 22 is more in the nature of a plug for one end of the cylinder, while the piston 21 is the compression device. When a briquette has been formed, the piston 22 is withdrawn and the briquette is ejected by a further movement of piston 21.

It will be observed by reference to Fig. 2 that the cylinder 20 is slightly tapered at the end containing portion 22 to permit an easy ejection of the briquette. The interior surface of the cylinder is highly polished also as an aid to compression and ejection by reason of reduction of surface friction.

There is a decided advantage resultant to the drying operation under high temperature, residing in the fact that this drying causes the wood particles to become more brittle, thus being less resistant during application of pressure to form the briquettes, and this makes possible the formation of a harder briquette with less power input, than if made from material that has not been dried out.

Another important item of this method resides in the manufacture of the briquette without generation of heat that would cause the moisture to be driven from the briquette. Explanatory to this, it will be mentioned here that there is now on the market a certain kind of compressed fuel made from comminuted wood material compressed by the action of a screw. The material goes into the press in a cold condition, but the friction and pressure of the screw, acting on the thin layers of material, increases its temperature up to a smoking hot condition at which the moisture is driven out. The result of this is that subsequently the briquette will absorb moisture from the atmosphere and will crumble in storage. In the present case, the compression is by a piston blow that does not increase the temperature of material to any appreciable extent. Tests have disclosed that the material has an average temperature of seventy degrees on entering and under compression of 30,000 to 50,000 pounds per square inch, its temperature is increased only forty-five degrees. Since the temperature is not increased, it can be understood that there is no dissipation of moisture from the briquette.

In a co-pending application, Serial No. 680,096, we disclosed as one of the advantages of the briquette, the fact that it burned as a piece of charcoal. This is very desirable, as it makes a hotter fire and burns longer. Tests have shown that in the present method this same result can be obtained so long as the moisture content of the hydrated material used does not go much beyond nine per cent. Above this percentage of moisture, the briquette expands to a greater extent and burns more rapidly.

Thus, the present method of manufacture, which comprises first drying the material to a bone dry condition, and then hydrating to a definite percentage of moisture is desirable and advantageous as it provides in the drying, the conditioning of the material to insure hardness of the briquette with minimum input of power. The hydrating insures the briquette against expansion by further absorption from the atmosphere and makes possible the manufacture of briquettes of uniform size.

It may be recited here that the important item of consideration in the manufacture of briquettes from wood waste material is that of expansion of the material after it has been compressed. The present invention deals with the pre-expansion of the particles of the material prior to compressing them into briquettes and it is in this pre-expansion, by a controlled hydration, that the invention specifically resides.

Having thus described our invention, what we claim as new therein and desire to secure by Letters Patent is—

1. The method of making compressed fuel briquettes from comminuted wood waste material which comprises reducing charges of comminuted material to a moisture free condition, hydrating the charges to obtain a uniform moisture condition throughout within a range at which the article will neither absorb from, nor give off moisture to the atmosphere, then compressing the material into briquettes.

2. The method of making briquettes from comminuted wood waste material which comprises reducing material, prior to its being compressed, to a moisture free condition, then applying moisture to the dry material to rehydrate it uniformly to a moisture content above that at which it will absorb atmospheric moisture and below that at which disruption of the article incident to ignition will occur, then compressing the material into briquettes.

3. The method of making briquettes from comminuted wood waste material which comprises circulating the material in suspension in a heated atmosphere until a moisture free condition exists, then circulating the dried material in suspension in a confined area into which an amount of moisture is injected for absorption by the dried material that will provide a moisture content within the material within that range at which it will not absorb atmospheric moisture nor will it be disrupted incident to ignition by reason of steam generation therein, and then compressing the material into briquettes in a manner whereby moisture content is not dissipated.

4. The method of making briquettes from comminuted wood waste material which comprises drying a charge of material to moisture free condition by circulation thereof in a heated atmosphere, circulating the charges of dry material in a confined area into which moisture for uniform rehydration of material is injected, then compressing definite charges of material, while cold, into briquettes by means not affecting their moisture content.

OLIVER P. M. GOSS.
WORTH C. GOSS.